United States Patent
Lee

(10) Patent No.: US 6,774,781 B1
(45) Date of Patent: Aug. 10, 2004

(54) SEATBELT SIGNAL LIGHT

(76) Inventor: Kyung Sang Lee, 61-44 232 St., Bayside, NY (US) 11364

( * ) Notice: Subject to any disclaimer, the term of this patent is extended or adjusted under 35 U.S.C. 154(b) by 59 days.

(21) Appl. No.: 10/224,965

(22) Filed: Aug. 20, 2002

Related U.S. Application Data

(60) Provisional application No. 60/313,431, filed on Aug. 20, 2001.

(51) Int. Cl.[7] .................................................. B60Q 1/26
(52) U.S. Cl. .................... 340/468; 340/457.1; 180/273; 180/268
(58) Field of Search .............................. 340/468, 457.1, 340/472, 457.3, 479, 464, 467; 180/268, 272, 273, 274, 275, 276; 188/1.11 R, 1.11 W, 1.11 L, 1.11 E

(56) References Cited

U.S. PATENT DOCUMENTS

| | | | |
|---|---|---|---|
| 4,849,733 A | | 7/1989 | Conigliaro et al. |
| 5,714,930 A | * | 2/1998 | McKinney, Jr. .............. 340/468 |
| 5,877,707 A | | 3/1999 | Kowalick |
| 6,059,066 A | | 5/2000 | Lary |
| 6,545,597 B1 | * | 4/2003 | Blount .................... 340/425.5 |

* cited by examiner

*Primary Examiner*—Jeffery Hofsass
*Assistant Examiner*—Jennifer Stone
(74) *Attorney, Agent, or Firm*—Matthew J. Peirce

(57) ABSTRACT

A safety light for use in vehicles is disclosed. The safety light would comprise a brake light and a seat belt signal light. The brake light would function as a normal window-mounted brake light would function, with the seat belt signal light functioning when a driver does not have their seat belt properly installed.

5 Claims, 2 Drawing Sheets

FIG 3
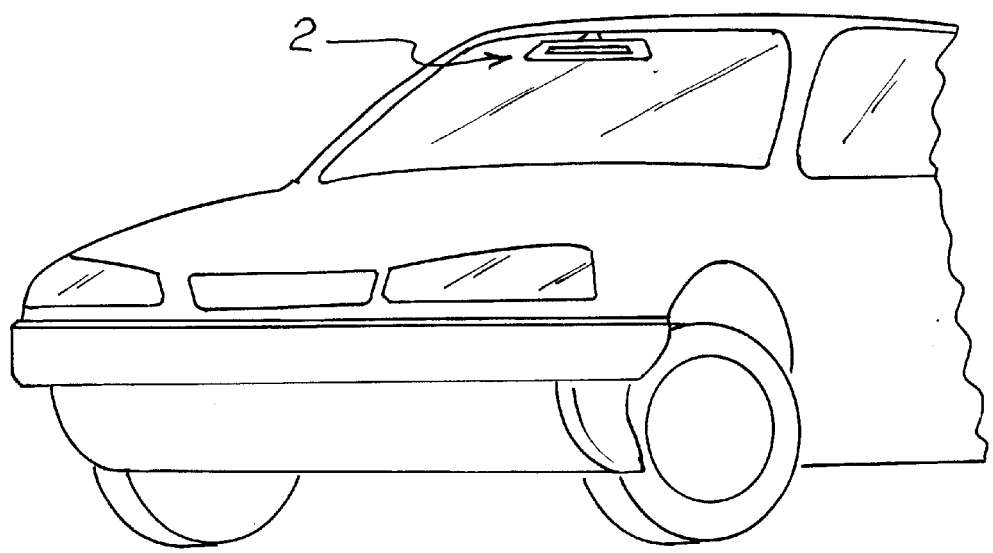
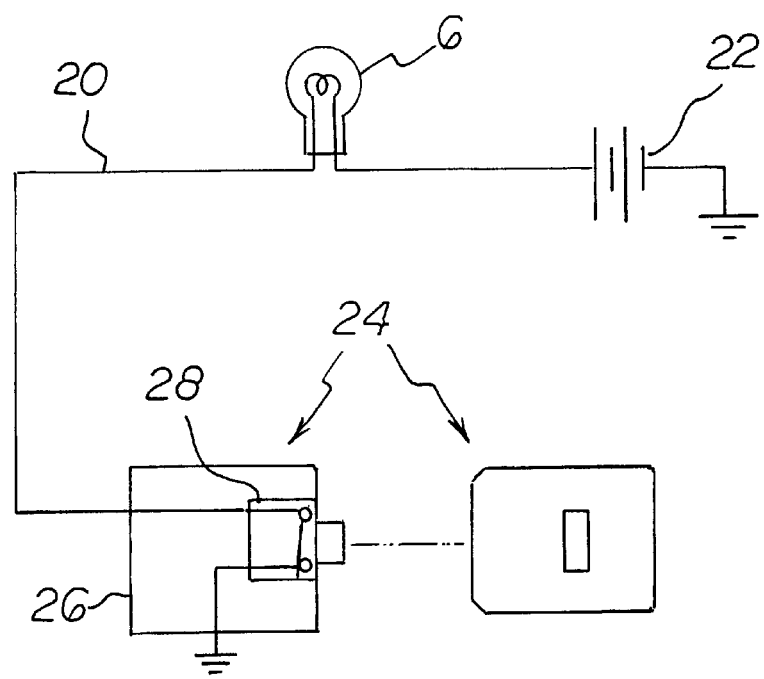
FIG 4

SEATBELT SIGNAL LIGHT

This application claims the benefit of U.S. Provisional application No. 60/313,431 filed Aug. 20, 2001.

BACKGROUND OF THE INVENTION

The present invention concerns that of a new safety light for use in vehicles.

DESCRIPTION OF THE PRIOR ART

U.S. Pat. No. 6,059,066, issued to Larry, discloses a means for indicating seat belt usage to observers outside a vehicle.

U.S. Pat. No. 5,877,707, issued to Kowalick, discloses a GPS based seat belt monitoring system.

U.S. Pat. No. 4,849,733, issued to Conigliaro, discloses a means for providing a visible display on the exterior of a vehicle to indicate whether the occupants have fastened their seat belts.

SUMMARY OF THE INVENTION

The present invention concerns that of a new safety light for use in vehicles. The safety light would comprise a brake light and a seat belt signal light. The brake light would function as a normal window-mounted brake light would function, with the seat belt signal light functioning when a driver does not have their seat belt properly installed.

There has thus been outlined, rather broadly, the more important features of a vehicle safety light that the detailed description thereof that follows may be better understood and in order that the present contribution to the art may be better appreciated. There are, of course, additional features of the vehicle safety light that will be described hereinafter and which will form the subject matter of the claims appended hereto.

In this respect, before explaining at least one embodiment of the vehicle safety light in detail, it is to be understood that the vehicle safety light is not limited in its application to the details of construction and to the arrangements of the components set forth in the following description or illustrated in the drawings. The vehicle safety light is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present vehicle safety light. It is important, therefore, that the claims be regarded as including such equivalent constructions insofar as they do not depart from the spirit and scope of the present invention.

It is therefore an object of the present invention to provide a vehicle safety light which has all of the advantages of the prior art and none of the disadvantages.

It is another object of the present invention to provide a vehicle safety light which may be easily and efficiently manufactured and marketed.

It is another object of the present invention to provide a vehicle safety light which is of durable and reliable construction.

It is yet another object of the present invention to provide a vehicle safety light which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

FIG. 3 shows another location in which the safety light could be installed.

FIG. 4 shows an electronic configuration of the safety light of the present invention.

DESCRIPTION OF THE PREFERRED EMBODIMENT

Priority is hereby claimed to application 60/313,431, filed on Aug. 20, 2001.

Figure 1:
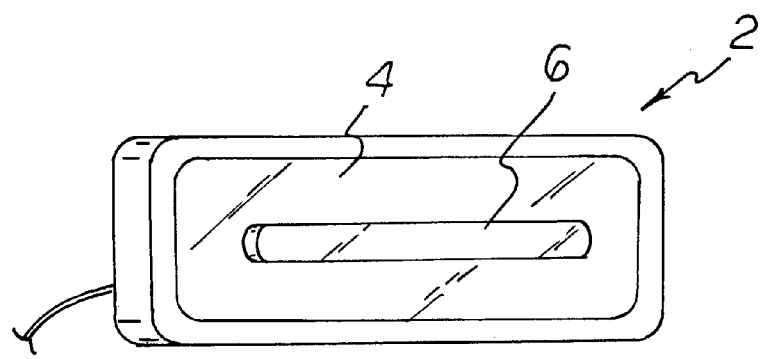
FIG. 1 shows a perspective view of the safety light of the present invention.

FIG. 1 shows a perspective view of the safety light of the present invention. Safety light 2 would be a combination of a brake light 4 and a seat belt signal light 6. Safety light 2 would preferably be mounted on the rear window of a vehicle, with brake light 4 and seat belt signal light 6 facing rearward. Brake light 4 and seat belt signal light 6 would receive power from power means 32, which would preferably be the vehicle battery.

Safety light 2 would preferably be fabricated in a rectangular shape. Most of the surface area of safety light 2 would be occupied by brake light 4, which would function as a typical brake light. Brake light 4 would normally be off except for when a user would be applying the brake pedal within the vehicle or when the user would be backing up the vehicle, at which time, the brake light 4 would turn on. Once the user would stop backing up or stop braking, then brake light 4 would turn off.

FIG. 4 shows an electronic configuration of the safety light of the present invention. Each seat belt signal 6 would operate on DC voltage and would be connected to the vehicle's DC power supply by electrical wiring 20, with the power supply preferably being a battery 22. Each seat buckle assembly 24 would have a receiver 26, with each receiver 26 having a micro switch 28 mounted within the interior of the receiver 26. The receiver 26 would be the portion of the seat buckle assembly into which a user would insert a metal tab into for removably attaching the seat belt 30 to the seat buckle assembly 24.

Micro switch 28 is normally in a closed position and serves as a switch between the battery 22 and both seat belt signal lights 6 within the two light assemblies 6. The micro switch 28 has the shape of a push button switch and is connected in series with the ground return path of the two light assemblies 2. In the closed configuration the power circuitry for the light assemblies 2 would be complete and thus, both seat belt signal lights 6 would be in an "on" position. Once a metal tab 34 would be placed within seat buckle assembly 24, the push button configuration of micro switch 28 would be depressed, the contacts would be opened, and the ground return path for the seat belt signal lights 6 would be an open circuit, causing the seat belt signal lights 6 to not illuminate.

Seat belt signal light 6 would automatically turn on once a user starts a particular vehicle with safety light 2 installed but before a user would fasten their seat belt. Seat belt signal light 6 would remain in an "on" position as long as the vehicle was on and a driver had not fastened their seat belt. Seat belt signal light 6 would be electronically connected to the same electronic mechanism and sensors which presently are in substantially all new vehicles which typically indicate if a user does not have a seat belt attached.

Figure 2:
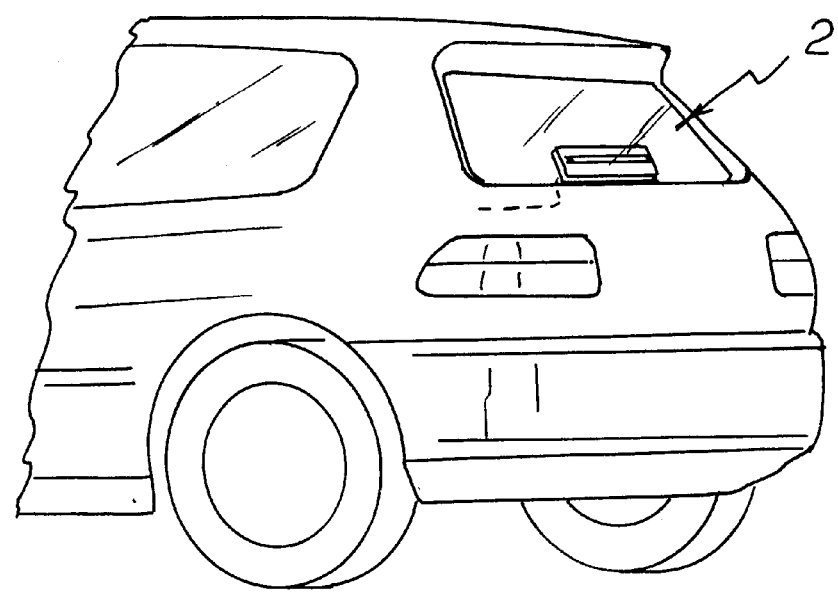
FIG. 2 shows a perspective view of the safety light of the present invention in use on a vehicle.

FIG. 2 shows a perspective view of the safety light 2 of the present invention in use on a vehicle. Safety light 2 is mounted in the rear window of the vehicle. Brake light 4 and seat belt signal light 6 are electronically connected to the electrical system of the vehicle as seen and described in FIG. 4.

FIG. 3 shows another location in which safety light 2 could be installed. Safety light 2 could be installed on the backside of a rear view mirror, allowing stationary individuals (such as police officers) an indication that a driver might not be wearing their seat belt. Safety light 2 could be installed only in the location shown in FIG. 3, or could alternatively be installed in locations both shown in FIGS. 2 and 3.

FIG. 4 shows an electronic configuration of the safety light of the present invention.

What I claim as my invention is:

1. A light assembly for the vehicle comprising:
    (a) a brake light, the brake light preferably having a rectangular shape, the brake light normally being in an "off" position, the brake light being activated when the brake pedal in the vehicle is depressed,
    (b) a seat belt signal light located in the middle of the brake light, the seat belt signal light having the shape of a thin strip, the seat belt signal light turning to an "on" position when a vehicle is started,
    (c) power means for providing power to the brake light and the seat belt signal light,
    (d) means for deactivating the seat belt signal light,
    (e) wherein the light assembly is mounted within the vehicle in a position allowing the light assembly to be viewed by other vehicles or bystanders.

2. A light assembly for a vehicle according to claim 1 wherein the power means is a vehicle battery.

3. A light assembly for a vehicle according to claim 2 wherein the means for deactivating the seat belt signal light further comprises:
    (a) a seat buckle assembly, the seat buckle assembly including a receiver, the receiver including an internal microswitch, the microswitch normally being in a closed position,
    (b) electrical wiring having two ends, a first end and a second end, the first end of the electrical wiring being connected to the power means, the second end of the electrical wiring being connected to the seat buckle assembly, the electrical wiring also being connected to the seat belt signal light,
    (c) a metal tab,
    (d) wherein the microswitch is an open circuit upon the insertion of the metal tab into the receiver, thereby causing the seat belt signal light to deactivate.

4. A light assembly for a vehicle according to claim 3 wherein the light assembly is mounted on back side of a rear view mirror, the rear view mirror being attached to the inside surface of a front windshield within the vehicle.

5. A light assembly for a vehicle according to claim 3 wherein the light assembly is mounted on the inner surface of a rear window.

* * * * *